UNITED STATES PATENT OFFICE.

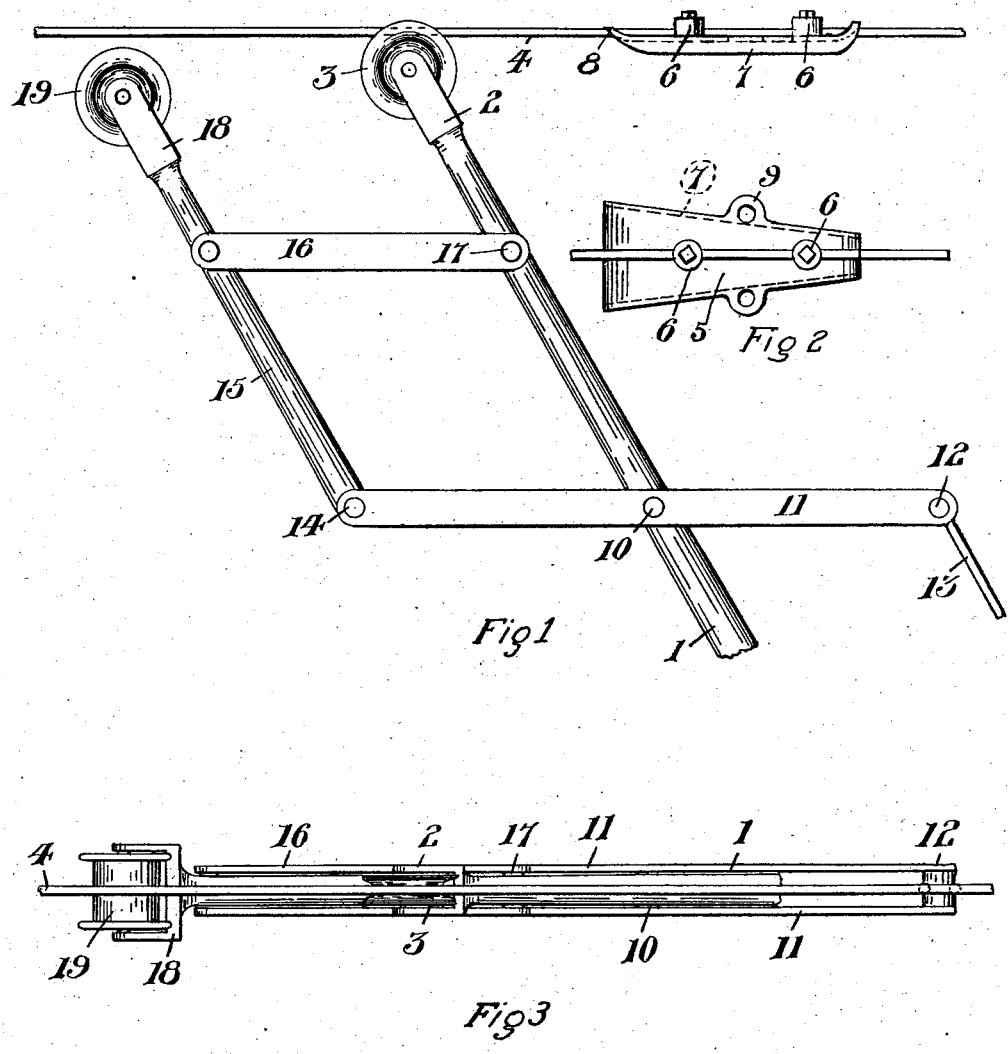

SIMON BRAUNER, OF PITTSBURGH, PENNSYLVANIA, ASSIGNOR OF ONE-THIRD TO JOHN M. SHWARTZ, OF PITTSBURGH, PENNSYLVANIA.

TROLLEY.

1,027,175.   Specification of Letters Patent.   Patented May 21, 1912.

Application filed January 20, 1912. Serial No. 672,445.

*To all whom it may concern:*

Be it known that I, SIMON BRAUNER, a citizen of the United States of America, residing at Pittsburgh, in the county of Allegheny and State of Pennsylvania, have invented certain new and useful Improvements in Trolleys, of which the following is a specification, reference being had therein to the accompanying drawing.

This invention relates to trolleys, and the primary object of my invention is the provision of simple and effective means, as will be hereinafter set forth, for restoring a displaced trolley wheel.

Another object of this invention is to furnish a trolley wire or electric conductor with a guide rail of novel construction for guiding a trolley wheel onto a wire.

A further object of this invention is to furnish a trolley pole with an auxiliary pole and wheel that is brought into service upon displacement of the main trolley wheel.

I attain the above objects by a device that obviates the necessity of a motorman or conductor leaving a car to replace a displaced trolley wheel, the device having the advantage of normally furnishing an electric circuit for operating a car that does not impair the operation of electric brakes, consequently the liability of an accident, on account of the operating circuit being broken, is reduced to a minimum.

The invention will be hereinafter specifically described and then claimed and reference will now be had to the drawing, wherein:—

Figure 1 is a side elevation of a trolley pole in accordance with this invention, Fig. 2 is a plan of a guide rail, and Fig. 3 is a plan of the trolley.

The reference numeral 1 denotes a portion of a trolley pole having a harp 2, and a revoluble trolley wheel 3 adapted to travel against a trolley wire 4 or other electric conductor. These elements are of the conventional form commonly used in connection with trolley operated street and suburban systems.

The trolley wire 4 at intervals is provided with tapering guide rails 5, each rail having hangers 6 connected to the wire 4 and depending guide flanges 7. The ends of the guide rail are bent upwardly, as at 8 to permit of a wheel easily riding into engagement with the same and intermediate the ends of the rail are oppositely disposed apertured ears 9, whereby the rail can be suspended by hanger wires from suitable poles or other supports. It is therefore apparent that the rail surface has a hanger for supporting the trolley wire 4 and can be used at suitable intervals in lieu of the ordinary hanger.

Pivotally connected to the sides of the main trolley pole 1 by a pin 10 are parallel side arms 11 having the forward ends thereof connected by a coupling 12 and said coupling is connected to the upper end of a rod 13 that has the lower end thereof connected to the roof of a car or vehicle (not shown). The rear ends of the side arms 11 are pivotally connected by a pin 14 to the lower end of an auxiliary pole 15, and said auxiliary pole is pivotally connected by links 16 to the main pole 1. The ends of the links 16 are pivotally held by pins 17.

The upper end of the auxiliary pole 15 has a wide harp 18 for a wide auxiliary trolley wheel 19, said wheel being approximately three times the width of the trolley wheel 3 and the bearing surface of said wheel is of the same diameter throughout. The bearing surface of the wheel 19 is normally positioned below the trolley wire 4 and is of such width as to project beyond each side of the trolley wire 4, as clearly illustrated in Fig. 3 and by setting up the wheel in such manner it is obvious that if the trolley wheel 3 should become displaced with respect to the trolley wire 4 the wheel 19 would engage the trolley wire 4 and at the same time limit the upward movement of the trolley wheel 3.

In the operation of the trolley, should the main wheel 3 become displaced the angle of the main pole 1 is changed and consequently the shape of the parallelogram formed by the poles 1 and 15, links 16 and arms 11. When the shape of the parallelogram is changed due to the displacing of the trolley wheel 3, the pole 1 tends to move from an inclined to a vertical position, under such circumstances carrying the pole 15 therewith and owing to the width of the wheel 19 it is obvious that as the pole 1 moves toward the vertical the wheel 19 will come into engagement with the trolley wire 4 arresting the movement of the pole 1 which carries the wheel 3, the latter will not extend entirely above the trolley wire 4, as the engagement of the trolley wheel 19 with the wire 4 will arrest the movement of the pole 1. The movement of the pole will equal the distance between the trolley wire 4 and the bearing surface of the wheel 19, the latter in normal position is arranged in proximity to the wire 4 but out of engagement therewith, as clearly shown in Fig. 1. The position of the trolley wheel with respect to the trolley wire 4 is such that as the trolley moves forward, with the wheel 19 in engagement with the wire 4, the wheel 3 or harp 2 will engage the guide 5, under such circumstances the pole 1 will be lowered and the wheel 3 will travel against the guide, the flanges of the latter will cause the wheel 3 to ride upon the wire 4. When the pole 1 is lowered by an engagement of the wheel 3 or harp 2 with the guide 5, the pole 15 is lowered and the wheel 19 moved from engagement with the trolley wire 4.

It is thought that the operation and utility of the trolley will be apparent without further description, and while in the drawing there is illustrated a preferred embodiment of the invention, it is to be understood that the structural elements are susceptible to such variations as fall within the scope of the appended claims.

What I claim is:—

1. In a trolley, the combination with a trolley wire, a main pole, and a main trolley wheel carried by said pole and adapted to ride against said wire, of a tapering guide member connected to said wire for guiding said wheel on the latter when the wheel is displaced therefrom and further serving as a hanger, and an auxiliary trolley wheel of greater width than the first mentioned wheel and movably supported by said pole and adapted to engage said wire when the main trolley wheel is displaced and prior to the engagement of the main trolley wheel with said guide member.

2. In a trolley, the combination with a wire, a pole, and a revoluble trolley wheel carried thereby and adapted to travel against said wire, of a tapering guide member carried by said wire and adapted to guide said wheel onto said wire when displaced, and conducting means carried by said pole adapted to engage said wire when said wheel is displaced therefrom prior to the engaging of the wheel with said guide member, said means in connection with said wire limiting the movement of the pole when the wheel is displaced therefrom and from said guide member.

3. In a trolley, the combination with a trolley wire, a main trolley pole, a main trolley wheel carried by said pole and adapted to travel against said wire, of a guide member connected to said wire for guiding said wheel onto said wire, arms pivotally connected to said pole, an auxiliary trolley pole having the lower end thereof pivotally connected to the rear ends of said arms, links having the ends thereof pivotally connected to said poles, and an auxiliary trolley wheel revolubly supported by said auxiliary pole and of greater width than the main trolley wheel and adapted to engage said wire when the main trolley wheel is displaced therefrom and prior to the engaging of the main trolley wheel with said guide member, said auxiliary trolley wheel further constituting means for the limiting of the main trolley wheel when the main trolley wheel is displaced off the wire and out of engagement with the guide member.

In testimony whereof I affix my signature in the presence of two witnesses.

SIMON BRAUNER.

Witnesses:
 MAX H. SROLOVITZ,
 CHRISTINA T. HOOD.

---

Copies of this patent may be obtained for five cents each, by addressing the "Commissioner of Patents. Washington, D. C."